No. 621,240. Patented Mar. 14, 1899.
R. FREYSINGER.
PNEUMATIC TIRED WHEEL FOR VEHICLES.
(Application filed Sept. 1, 1898.)
(No Model.)
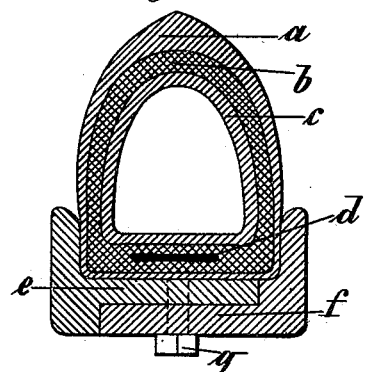
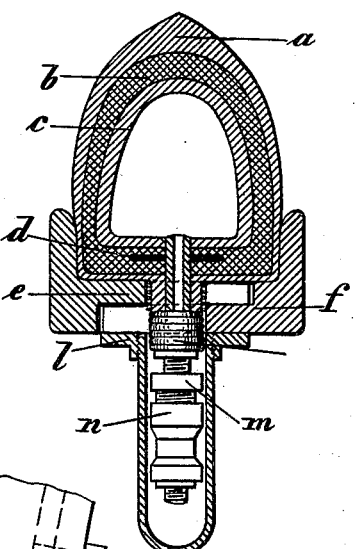
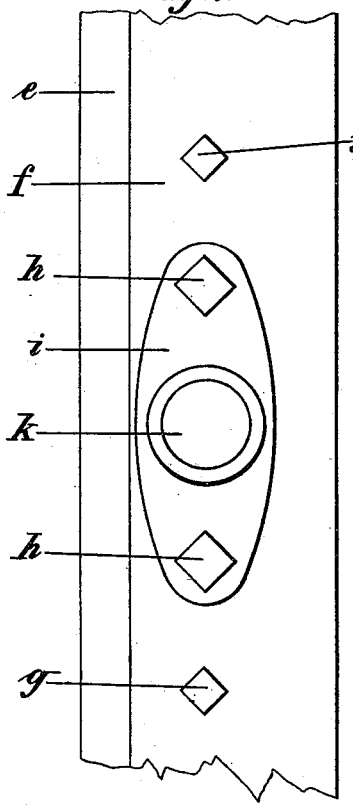
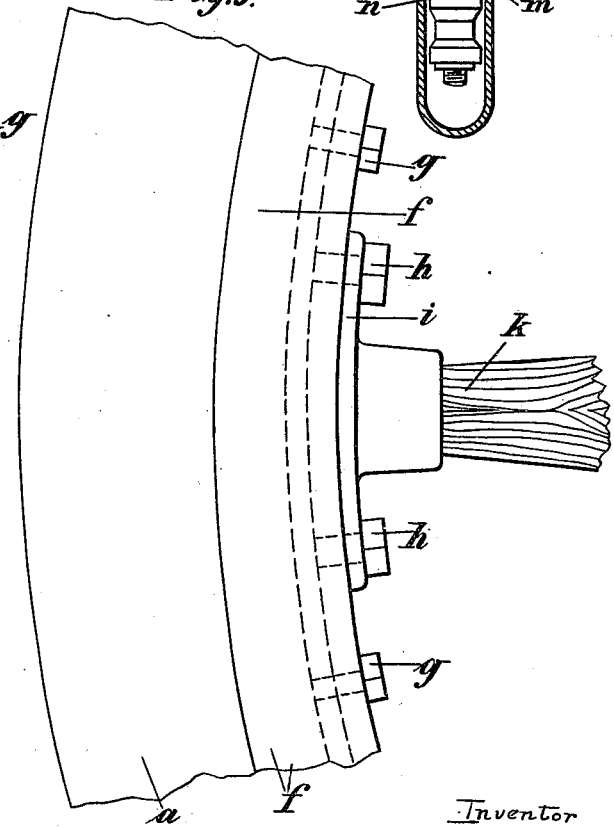
Witnesses
Inventor
Rudolf Freysinger
By James L. Norris
Atty

United States Patent Office.

RUDOLF FREYSINGER, OF SASSENHOF, RUSSIA.

PNEUMATIC-TIRED WHEEL FOR VEHICLES.

SPECIFICATION forming part of Letters Patent No. 621,240, dated March 14, 1899.

Application filed September 1, 1898. Serial No. 690,016. (No model.)

*To all whom it may concern:*

Be it known that I, RUDOLF FREYSINGER, a subject of the Emperor of Russia, residing at Sassenhof, near Riga, in the Baltic Provinces, Russian Empire, have invented certain new and useful Improvements in Pneumatic-Tired Wheels for Vehicles, of which the following is a full, clear, and exact specification.

The present invention relates to improvements in wheels with pneumatic tires for vehicles, and especially relates to the construction of the tire and rim.

The usual pneumatic tires for vehicles are substantially the same as those employed for cycles, only they are stronger, owing to the greater weight they have to carry, but they have the disadvantage of being less durable and easily inclined to part from the rim, especially in making short curves.

The substantial difference of my improved form of pneumatic tire over the old form is that it has a broad base and a narrow tread. As shown by the accompanying drawings, the section is almost triangular, its base corresponding with that part of the tire which lies on the rim, while its point forms the tread. In consequence of this peculiar form the tread in riding presses itself into the tire, thus tending to avoid the bending or crushing of the sides, while the existing tires have usually a narrow surface in contact with the rim and a broad tread which causes the sides of the tire to be rubbed and crushed against the rim, and consequently occasions quick wear.

The second part of the present invention relates to the rim, which, as shown by the drawings, consists of two independent parts overlapping each other, which are bent off to the side at a right angle, whereby a safe hold of the tire is conditioned in the first place, and in the second place the tire can be easily fixed on the rim, as will be described below.

In the accompanying drawings, Figure 1 is a cross-sectional view of a pneumatic tire and rim constructed according to my invention. Fig. 2 is an inside view of a section of the rim. Fig. 3 is a side view of the same with the socket for the spoke of the wheel. Fig. 4 is a section through the tire and valve and showing the protecting-casing screwed on the rim.

The tire is constructed in the manner of a hose in one piece, and consists of an interior rubber tube $c$, around which the material $b$ is placed. The latter is again covered by an outer mantle of india-rubber $a$. Within the material $b$ a flat metal strip $d$ is embedded near the surface of that side of the tire which lies on the rim and which strip assists in holding the tires on the rim.

For the reception of the valve the side of the tire which touches the rim is provided with a tube-shaped piece $o$ for communication with the interior of the tire, on which the air-valve $n$ is fixed. The rim, which is made of iron, wood, or other suitable material, consists, as aforementioned, of the two parts $e$ and $f$, having overlapping bottoms, as shown by Figs. 1 and 4. These two overlapping parts are fixed to each other by screws $g$ after the tire has been put on. In order to remove the tire, the screws $g$ are loosened so much that, for instance, the left half $e$ of the rim, with the rubber strip resting on it, can be taken off, while the right half $f$ remains. To the latter half $f$ the sockets $i$, in which the spokes $k$ are placed, are fastened by screws $h$. The pneumatic tire can therefore be fitted in a few minutes by shifting part $e$ on part $f$ and fixing by means of the screws $g$ without the wheel having to be taken from the vehicles or from the axle.

As the tire is provided with a valve projecting inside of the rim, parts $e$ and $f$ of the rim, in order to enable the putting on of the tire, are each provided with a notch which extends from its inner edge to its longitudinal center and which notches register to form a passage for the valve, as will be understood. Under the notch of part $f$ of the rim a metal plate $l$ is screwed on, which is also provided with a screw-threaded opening, in which the cap $m$ is screwed for the purpose of protecting the valve against damage. The two halves $e$ and $f$ forming the rim are bent over at the lateral edge at a right angle, so as to embrace the base of the tire and prevent the slipping off of the same.

What I claim is—

A pneumatic tire having a flat side or base for engagement with the rim and opposite approximately parallel side members, and having a valve, in combination with a rim consisting of two overlapping parts connected to each other to form a flat bearing-surface for the flat side of the tire and having their outer sides bent up at a right angle to form retaining-flanges for engagement with the parallel portions of the sides of the tire and their inner sides provided with registering notches to form a passage for the valve, the lower of said overlapping parts having secured thereto a plate provided with a screw-threaded aperture, and a protecting-cap for the valve having a screw-threaded end engaging in the threads of said aperture, substantially as described.

In witness whereof I have hereunto set my hand in presence of two witnesses.

RUDOLF FREYSINGER.

Witnesses:
 FRANZ LANGE,
 ERNST ETVR.